US012649159B2

(12) United States Patent
Stewart et al.

(10) Patent No.: US 12,649,159 B2
(45) Date of Patent: Jun. 9, 2026

(54) FROTHING AGENT FOR FLOTATION OF ORES

(71) Applicant: BASF SE, Ludwigshafen (DE)

(72) Inventors: Graeme Levi Stewart, Ludwigshafen (DE); Alexej Michailovski, Ludwigshafen (DE); Yoav Zuk, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 650 days.

(21) Appl. No.: 18/015,625

(22) PCT Filed: Jul. 27, 2021

(86) PCT No.: PCT/EP2021/071031
§ 371 (c)(1),
(2) Date: Jan. 11, 2023

(87) PCT Pub. No.: WO2022/033868
PCT Pub. Date: Feb. 17, 2022

(65) Prior Publication Data

US 2023/0302463 A1 Sep. 28, 2023

(30) Foreign Application Priority Data

Aug. 12, 2020 (EP) .................................... 20190647

(51) Int. Cl.
*B03D 1/008* (2006.01)
*B03D 1/004* (2006.01)

(52) U.S. Cl.
CPC ........... *B03D 1/008* (2013.01); *B03D 1/0043* (2013.01); *B03D 2201/04* (2013.01); *B03D 2203/02* (2013.01)

(58) Field of Classification Search
CPC .. B03D 1/008; B03D 1/0043; B03D 2201/04; B03D 2203/02
(Continued)

(56) References Cited

U.S. PATENT DOCUMENTS 2,611,485 A 9/1952 Tveter
2,695,101 A 11/1954 Booth et al.
(Continued)

FOREIGN PATENT DOCUMENTS

GB 2212418 B 5/1991
WO WO-2022/033868 A1 2/2022

OTHER PUBLICATIONS

International Search Report for International application No. PCT/EP2021/071031, mailed Oct. 20, 2021, 2 pages.
(Continued)

*Primary Examiner* — Anita Nassiri-Motlagh
(74) *Attorney, Agent, or Firm* — Faegre Drinker Biddle & Reath LLP

(57) ABSTRACT

Described herein are methods for flotation of an ore. The methods include providing an aqueous suspension having an ore in the form of particles, water, and a first frothing agent including a poly(tetrahydrofuran), in a flotation cell to obtain a provided aqueous suspension. The method further includes introducing air into the provided aqueous suspension to obtain a froth. Further described herein are specific aqueous suspensions having ore particles and poly(tetrahydrofuran) and uses of poly(tetrahydrofuran) as a frothing agent for an aqueous suspension having an ore in the form of particles.

20 Claims, 2 Drawing Sheets

(58) Field of Classification Search
USPC .......................................................... 252/61
See application file for complete search history.

(56) References Cited

U.S. PATENT DOCUMENTS

| | | | |
|---|---|---|---|
| 3,595,390 | A | 7/1971 | Booth |
| 3,595,930 | A | 7/1971 | Hofmann |
| 4,039,466 | A | 8/1977 | Matsuda |
| 2006/0239876 | A1 | 10/2006 | Leeming et al. |
| 2009/0266746 | A1 | 10/2009 | Behr |

OTHER PUBLICATIONS

International Preliminary Report on Patentability for International Application No. PCT/EP2021/071031, mailed Feb. 23, 2023, 8 pages.

European Search Report for EP Patent Application No. 20190647.6, Issued on Jan. 22, 2021, 3 pages.

FROTHING AGENT FOR FLOTATION OF ORES

CLAIM OF PRIORITY

This application is a National Stage of International Application No. PCT/EP21/71031, filed Jul. 27, 2021, which claims the benefit of European Patent Application No. 20190647.6 filed Aug. 12, 2020, which is incorporated by reference herein.

FIELD

The current invention relates to a method for flotation of an ore, which comprises introducing air into an aqueous suspension comprising an ore in the form of particles and poly(tetrahydrofuran). Further embodiments are an aqueous suspension comprising an ore in the form of particles and poly(tetrahydrofuran).

BACKGROUND OF THE INVENTION

Froth flotation is a widely used method for separating fine solids from other solids by taking advantage of the disparity in wettability at solid particle surfaces. Separation of a solid mixture may be accomplished by the selective attachment of hydrophobic solid particles to gas bubbles. Most often air is used as the gas. The gas is passed through a liquid mixture of the crude solids at a such a rate as to provide a sustained "froth" or accumulation of bubbles at the liquid-surface interface. The density difference between the gas bubbles and liquid provides the attached solid particles with buoyancy, lifting the hydrophobic solid particles to the surface and leaving behind non-hydrophobic solids in the bulk liquid mixture. The hydrophobic solid particles at the surface remain attached to the surface area of the bubbles, which form the froth, and can be subsequently separated from bulk liquid mixture by draining the liquid bulk mixture or mechanically skimming the froth at the surface.

The use of a frothing agent (foaming agent or frother) is required for most mineral processing operations that utilize froth flotation as a method for the selective concentration of specific minerals. The frothing agent stabilizes the gas bubbles, which carry the hydrophobic solid particles to the surface of the liquid bulk mixture. The stabilization of the bubbles or the formed surface froth enhances the separating efficiency of the hydrophobic particles from the liquid bulk mixture of solids. The characteristics of a generated foam are important for a success of the flotation method. Several different classes of chemicals have been utilized as foaming agents in froth flotation methods of ores or coal.

U.S. Pat. No. 2,611,485 discloses frothing agents for froth flotation of ores, which are lower alkyl and phenyl mono-ethers of propylene glycol or of polypropylene glycols.

U.S. Pat. No. 2,695,101 discloses frothing agents for froth flotation of ores and coal, which are dihydroxy compounds such as polypropylene glycols. For example prepared by reacting propylene oxide with propylene glycol according to the equation HOC3H6OH+mC3H6O->HO(CH2CHCH3O) mCH2CHCH3OH. Either a pure compound, a reaction mixture or mixed fractions are desirable.

U.S. Pat. No. 3,595,390 discloses frothing agents for froth flotation of ores and coal, which are poly(ethylene-propylene) glycols or lower alkyl mono-ethers of poly(ethylene-propylene) glycols having an average molecular weight in the range of about 150 to about 2500.

US 2006/0239876 A1 discloses frothing agents for froth flotation of ores and coal, which are C3-C9 secondary alcohols having a low degree of ethoxylation. In one aspect, these are compounds of formula I'

(I')

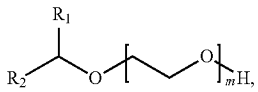

wherein R1 and R2 are each independently C1-C4 alkyl, and m is 1, 2, 3, 4 or 5. In another aspect, this is a composition of at least two compounds of formula I', wherein m is an integer>=0 and the average molar value of n for the total of the compounds of formula I' is the composition is in the range of 1 to 3. MIBC (methyl isobutyl carbinol, a compound with R1=C1 alkyl, R2=tertbutyl and m=0) is employed as a comparative frothing agent in the examples.

There is still a need for further frothing agents for flotation of ore. In a first aspect, it is attractive to reduce the amount of chemicals in a flotation method in general. Hence, a reduced amount of frothing agent, which provides the same or a rather similar performance, e.g. a froth height, a recovery rate or a selectivity versus an undesired component, is desirable. In a second aspect, a frothing agent, which supports a flotation method towards an improved recovery rate of a desired value component or an improved selectivity versus an undesired component, is desirable. These technical effects might be caused or supported by a smaller gas bubble size, which provides a larger bubble surface area at a given foam volume, by a reduced coalescence of once formed gas bubbles respectively an increased lifetime of the once formed gas bubbles or a lower content of water of the foam.

BRIEF SUMMARY OF THE INVENTION

It has now been found a method for flotation of an ore, which comprises the steps of (A) providing an aqueous suspension comprising (i) an ore, which is in the form of particles, (ii) water, (iii) a first frothing agent in a flotation cell to obtain a provided aqueous suspension, (B) introducing air into the provided aqueous suspension to obtain a froth, characterized in that the first frothing agent is a poly(tetrahydrofuran).

DETAILED DESCRIPTION OF THE INVENTION

A froth height of a generated foam is an indicator of its stability. A stable foam will rise higher due to a higher stability of the bubbles (reduction in bubble coalescence). A bubble, which is more stable respectively possesses a higher strength, which in turn provides a higher probability of supporting a coarse particle (resistance to bubble deformation).

An ore, which is in the form of chunks, for example after being mined, is transformed into the form of particles by grinding and/or crushing. A mill for grinding of hard rocks is for example a planetary ball mill, especially at laboratory scale. An ore, which is already in the form of loosely aggregated particles, is transformed into the form of particles by gentle disintegration. Preferably, the ore, which is in form of particles, is not treated with an organic coating, very preferably a coating, before getting in contact with the water and the first frothing agent. Preferably, the surface of the ore, which is in the form of particles, is not reacted with a chemical reagent before getting in contact with the water and the first frothing agent. Preferably, the surface of the ore, which is in the form or particles, is not grafted with a chemical reagent before getting in contact with the water and the first frothing agent.

The particle size of the particles of the ore can be determined by ASTM E276-13, i.e. “Standard test method for particle size or screen analysis at No. 4 (4.75-mm) sieve and finer for metal-bearing ores and related materials”.

Preferably, 80 wt. % of the ore particles pass a 500 μm sieve, very preferably a 400 μm sieve, particularly a 300 μm sieve, very particularly a 250 μm sieve and especially a 150 μm sieve.

Preferred is a method, wherein at least 80 percent by weight of the ore particles pass a 500 μm sieve.

A slime is an aqueous suspension of slime solids, which are ultrafine soil solids associated with the ore. 99-100 wt. % of the slime solids pass a 150 mesh screen with mesh size referring to the Tyler Standard Series and possess a particle size of less than about 105 μm. Typically, as much as 50 wt. % of the slime solids have a particle size which is below 10 μm. Hence, the slime solids have an average a particle size in the order of 10 μm. Flat particles especially contribute to slime formation. As a general rule, around 66 to 75 wt. % of the slime solids pass through a 325 mesh screen and have an average particle size less than 44 μm. Slime solids can be removed from the aqueous suspension, which contains the ore in the form of particles (=desliming). Desliming is for example done by separation via a cyclone, a hydroseparator or other conventional equipment. An aqueous suspension, from which slime solids are removed, is deslimed. Preferably, the aqueous suspension is a deslimed aqueous suspension. The aqueous suspension, which is deslimed, has preferably been deslimed prior to the addition of the first frothing agent, very preferably prior to the addition of the first frothing agent and prior to being placed into the flotation cell. Particularly, the aqueous suspension is deslimed prior to step (B) of introducing air. Very particularly, the aqueous suspension is deslimed prior to a flotation.

Poly(tetrahydrofuran) (CAS-No. 25190-06-1, short symbol PTHF according to DIN EN ISO 1043-1 2002-06) is also called polytetramethylene glycols (PTMO), poly(tetramethylene ether) glycol (PTMEG) or poly(tetramethylene oxide) (PTMO). A poly(tetrahydrofuran) can be expressed by a compound of formula I

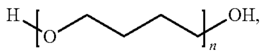

(I)

wherein n is an integer and n is one or more, for example n=1, 2, 3, 4, 5, 6, 7, 8, 9, 10, 11, 12, 13, 14, 15 or 16. Preferably, poly(tetrahydrofuran) comprises a mixture of two or more different compounds of formula I. A compound of formula I is for example one of the formulae M-1 (n=1), M-2 (n=2), M-3 (n=3), M-4 (n=4), M-5 (n=5), M-6 (n=6), M-7 (n=7), M-8 (n=8), M-9 (n=9), M-10 (n=10), M-11 (n=11), M-12 (n=12), M-13 (n=13), M-14 (n=14), M-15 (n=15) or M-16 (n=16).

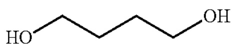

(M-1)

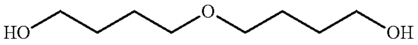

(M-2)

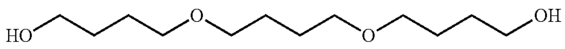

(M-3)

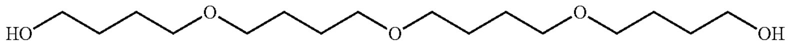

(M-4)

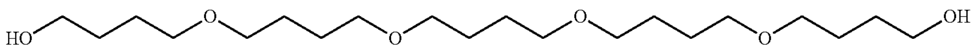

(M-5)

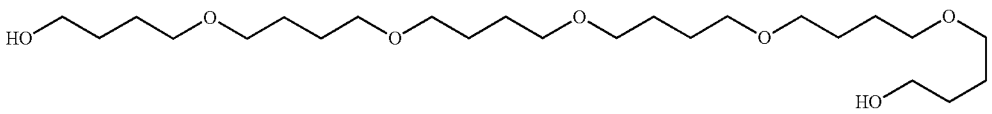

(M-6)

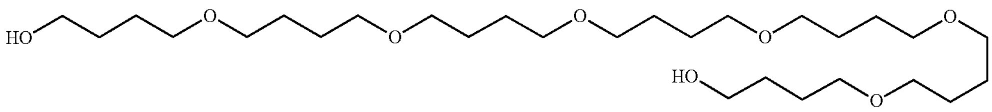

(M-7)

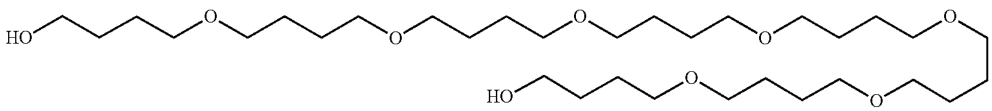

(M-8)

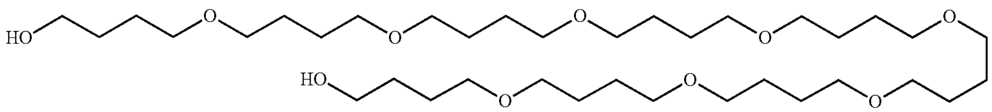

(M-9)

-continued (M-10)

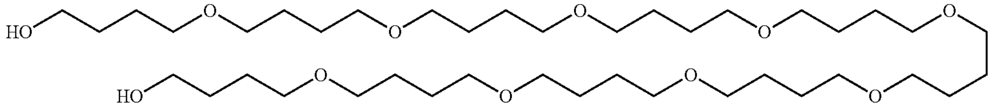

(M-11)

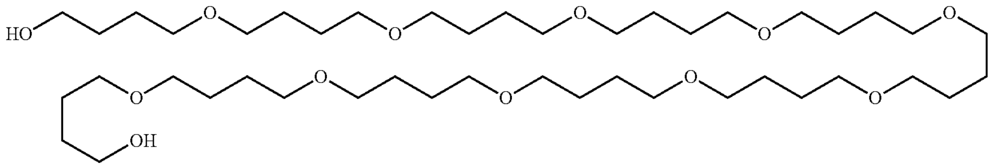

(M-12)

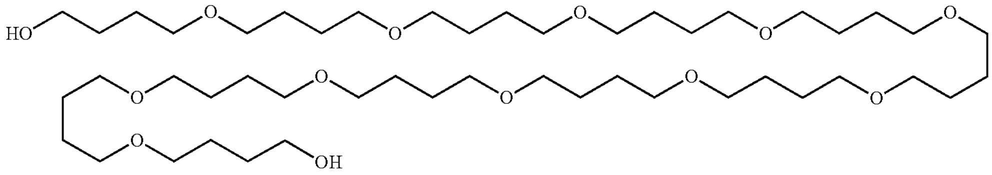

(M-13)

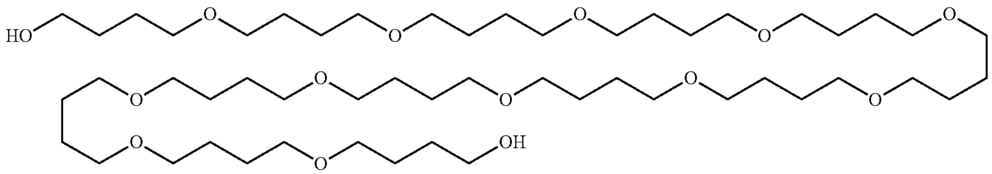

(M-14)

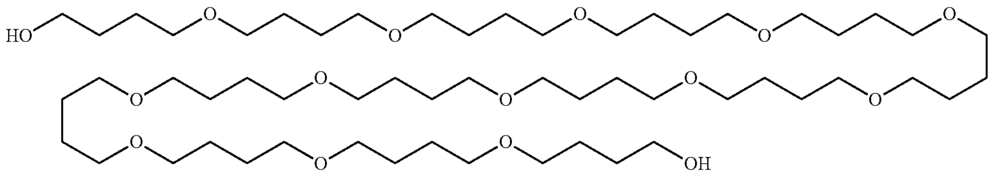

(M-15)

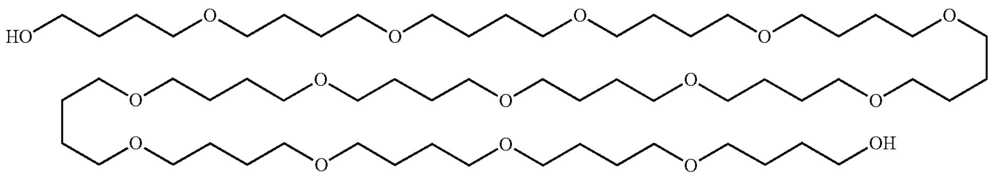

(M-16)

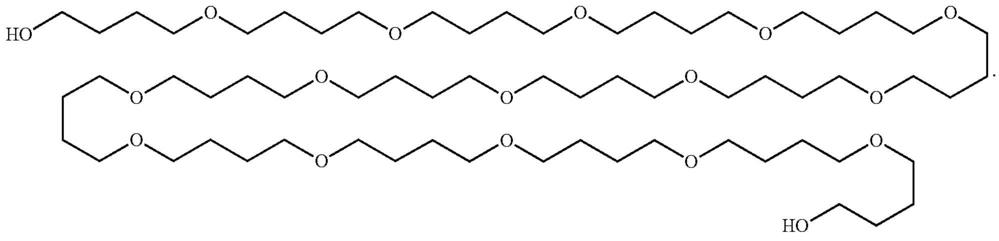

The compounds of formula I are alpha-omega-dihydroxy compounds. The alpha-omega-dihydroxy compound of formula M-1 has a molecular weight of 90.1 g/mol, the one of formula M-2 has 162.2 g/mol, the one of formula M-3 has 234.3 g/mol, the one of formula M-4 has 306.4 g/mol, the one of formula M-5 has 378.5 g/mol, the one of formula M-6 has 450.6 g/mol, the one of formula M-7 has 522.8 g/mol, the one of formula M-8 has 594.9 g/mol, the one of formula M-9 has 667.0 g/mol, the one of formula M-10 has 739.1 g/mol, the one of formula M-11 has 811.2 g/mol, the one of formula M-12 has 883.3 g/mol, the one of formula M-13 has 955.4 g/mol, the one of formula M-14 has 1027.5 g/mol, the one of formula M-15 has 1099.6 g/mol and the one of formula M-16 has 1171.7 g/mol.

A number-average molecular weight Mn of poly(tetrahydrofuran) can be calculated from the hydroxyl number. The hydroxyl number can be determined by titration, for example acetic anhydride or phthalic anhydride method, or by spectroscopic methods, for example calibrated IR-scans or end-group determination by NMR. In “Number-average molecular weight and functionality of poly(tetramethylene glycol) by multidetector SEC”, C. A. Harrison et al, Journal of Applied Polymer Science, 1995, 56, 211-220, size exclusion chromatography (SEC) of poly(tetrahydrofuran) is conducted with different detectors, including a poly(tetrahydrofuran) with a number-average molecular weight Mn=250. Preferably, the poly(tetrahydrofuran) has a number-average molecular weight Mn in the range of 200 to 1200, very preferably 200 to 1000, particularly 210 to 700, very particularly 210 to 500, especially 220 to 350 and very especially 230 to 290.

ISO 14900:2017 entitled "Plastics—polyols for use in the production of polyurethane—determination of hydroxyl number" specifies two methods for the measurement of the hydroxyl number of polyols. For Polyols used as polyurethane raw materials, it is necessary to know the hydroxyl content of polyols to properly formulate polyurethane systems. Method A of ISO 14900: 2017 is intended for sterically hindered polyols, whereas method B of ISO 14900 is intended inter alia for polyether polyols and hence also for poly(tetrahydrofuran).

A weight-average molecular weight Mw of poly(tetrahydrofuran) can be determined by gel permeation chromatography (GPC). Gas chromatography (GC) is suitable for Mw of lower molecular weight types of poly(tetrahydrofuran). High performance liquid chromatography (HPLC), without or with derivatization, for example with phenyl isocyanate, is suitable for Mw, especially for lower molecular weight types of poly(tetrahydrofuran). In "High-performance liquid chromatography of poly(tetramethylene ether) glycols", G. D. Andrews et al., Macromolecules 1982, 15, 1580-1583, GPC, GC and HPLC after derivatization with phenyl isocyanate are shown for different poly(tetrahydrofuran)s, including a poly(tetrahydrofuran) with a number-average molecular weight Mn=300. In "Separation of polybutylene glycols on C18 and C4 stationary phases", K. Rissler et al., Journal of Liquid chromatography, 1994, 17(13), 2791-2808, HPLC of different non-derivatized poly(tetrahydrofuran) is shown, including a poly(tetrahydrofuran) with a number-average molecular weight Mn=650.

Polydispersity of a poly(tetrahydrofuran) is calculated by Mw/Mn of the poly(tetrahydrofuran).

The content of an individual compound in poly(tetrahydrofuran), which comprises two or more different alpha-omega-dihydroxy compounds, can be stated based on the weight of an individual compound in relation to the overall weight of all compounds of poly(tetrahydrofuran). For this, all compounds of poly(tetrahydrofuran) are those of formula I

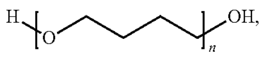

(I)

wherein n is an integer and n is one or more, especially 1 to 16.

Hence, there is a main compound by weight, i.e. the compound which has the highest weight content of all compounds of poly(tetrahydrofuran). Furthermore, there is a second-ranked compound by weight, i.e. the compound which has the second-highest weight content of all compounds of poly(tetrahydrofuran), and in analogy a third-ranked compound by weight.

The content of an individual compound in poly(tetrahydrofuran) can also be stated based on the number of molecules of an individual compound in relation to the overall number of molecules of all compounds of poly(tetrahydrofuran). For this, all compounds of poly(tetrahydrofuran) are those of formula I

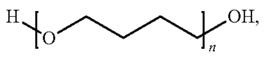

(I)

wherein n is an integer and n is one or more, especially 1 to 16.

Hence, there is a main compound by mol, i.e. the compound which has the highest number of molecules of all compounds of poly(tetrahydrofuran). Furthermore, there is a second-ranked compound by mol, i.e. the compound which has the second-highest number of molecules of all compounds of poly(tetrahydrofuran), and in analogy a third-ranked compound by mol.

Preferably, the main compound by weight of the poly (tetrahydrofuran) is selected from the group consisting of the compounds of formulae M-2, M-3 and M-4. Very preferably, the main compound by weight and the second-ranked compound by weight are selected from the group consisting of compounds of the formulae M-2, M-3 and M-4. Particularly, the main compound by weight, the second-ranked compound by weight and the third-ranked compound by weight of the poly(tetrahydrofuran) are selected from the group consisting of compounds of formulae M-2, M-3 and M-4.

Preferably, the main compound by weight of the poly (tetrahydrofuran) is a compound of formula M-3. Very preferably, the main compound by weight is a compound of formula M-3 and the second-ranked compound by weight is selected from the group consisting of the formulae M-2 and M-4. Particularly preferably, the main compound by weight is a compound of formula M-3 and the second-ranked compound by weight and third-ranked compound by weight are selected from the group consisting of the formulae M-2 and M-4.

Preferably, the main compound by mol of the poly(tetrahydrofuran) is selected from the group consisting of the compounds of formulae M-2, M-3 and M-4. Very preferably, the main compound by mol and the second-ranked compound by mol are selected from the group consisting of compounds of the formulae M-2, M-3 and M-4. Particularly, the main compound by mol, the second-ranked compound by mol and the third-ranked compound by mol of the poly(tetrahydrofuran) are selected from the group consisting of compounds of formulae M-2, M-3 and M-4.

Preferably, the main compound by mol of the poly(tetrahydrofuran) is a compound of formula M-3. Very preferably, the main compound by mol is a compound of formula M-3 and the second-ranked compound by mol is selected from the group consisting of the formulae M-2 and M-4. Particularly, the main compound by mol is a compound of formula M-3 and the second-ranked compound by mol and third-ranked compound by mol are selected from the group consisting of the formulae M-2 and M-4.

Preferably, the main compound by weight of the poly (tetrahydrofuran) is selected from the group consisting of the compounds of formulae M-2, M-3 and M-4 and the main compound by mol of the poly(tetrahydrofuran) is selected from the group consisting of the compounds of formulae M-2, M-3 and M-4.

Preferably, the main compound by weight of the poly (tetrahydrofuran) is the compound of formula M-3 and the main compound by mol of the poly(tetrahydrofuran) is the compound of formula M-3.

Preferably, the poly(tetrahydrofuran) has a number-average molecular weight Mn in the range of 220 to 350 and the main compound by weight of the poly(tetrahydrofuran) is selected from the group consisting of the compounds of formulae M-2, M-3 and M-4.

Preferably, the poly(tetrahydrofuran) has a number-average molecular weight Mn in the range of 220 to 350, the main compound by mol of the poly(tetrahydrofuran) is selected from the group consisting of the compounds of formulae M-2, M-3 and M-4.

Preferably, the poly(tetrahydrofuran) has a number-average molecular weight Mn in the range of 220 to 350, the main compound by weight of the poly(tetrahydrofuran) is selected from the group consisting of the compounds of formulae M-2, M-3 and M-4, and the main compound by mol of the poly(tetrahydrofuran) is selected from the group consisting of the compounds of formulae M-2, M-3 and M-4.

Preferably, the poly(tetrahydrofuran) has a number-average molecular weight Mn in the range of 220 to 350, the main compound by weight of the poly(tetrahydrofuran) is the compound of formula M-3 and the main compound by weight of the poly(tetrahydrofuran) is the compound of formula M-3.

Preferred is a method, wherein the poly(tetrahydrofuran) has a number-average molecular weight Mn in the range of 200 to 1000.

Preferred is a method, wherein the poly(tetrahydrofuran) has a number-average molecular weight Mn in the range of 210 and 700.

Preferred is a method, wherein the poly(tetrahydrofuran) has a number-average molecular weight Mn in the range of 220 and 350.

Poly(tetrahydrofuran) is obtainable by polymerization of tetrahydrofuran (THF) with oxonium ions as a catalyst as disclosed by the fundamental work of H. Meerwein et al. in Angew. Chem., 72, 1960, 927. A polymerization of tetrahydrofuran is preferably conducted by employing antimony pentachloride as catalyst and a carboxylic acid of at least two carbon atoms or a carboxylic acid anhydride of a monocarboxylic acid or a dicarboxylic acid of two to four carbon atoms at a polymerization temperature from 0° C. to 70° C. as described in U.S. Pat. No. 4,259,531. Another method for polymerization of tetrahydrofuran uses the polymerization of tetrahydrofuran over a heterogenous catalyst in the presence of one of the telogens water, 1,4-butanediol or poly (tetrahydrofuran) having a molecular weight of from 200 to 700 Dalton or a C1-C10 monocarboxylic acid or mixtures of these telogens as described in U.S. Pat. No. 5,773,648. The used catalyst is a supported catalyst, which contains a catalytically active amount of an oxygen-containing tungsten or molybdenum compound of mixtures of these compounds on an oxidic support material and which was calcinated at temperatures ranging from 500 to 1000° C.

Preferably, the poly(tetrahydrofuran) contains an antioxidant in an amount below 0.1 wt. % based on the overall weight of the poly(tetrahydrofuran), very preferably in the range of 0.01 wt. % to 0.09 wt. %, particularly in the range of 0.02 wt. % to 0.08 wt. %, very particularly in the range of 0.03 wt. % to 0.07 wt. % and especially in the range of 0.04 wt. % to 0.05 wt. %. Accordingly, the weight of the antioxidant is part of the weight of component (iii). The antioxidant is preferably a phenolic antioxidant, very preferably a phenolic antioxidant with a steric hinderance, wherein the steric hindrance means at least one C4-C8 alkyl group in an ortho-position to the phenolic hydroxy group or two C1-C3 alkyl groups in the two ortho positions to the phenolic hydroxy group, particularly a molecule containing a 2,6-di-tert-butyl-phenol moiety as structural element and very particularly 2,6-di-tert-butyl-4-methyl-phenol.

Preferably, the ore comprises a first mineral. The first mineral consists of an inorganic salt, which has an anionic part and a cationic part. The first mineral can be classified based on one contained chemical element, often a metal forming at least part of the cationic part of the inorganic salt, or based on a contained assembly of more than one chemical elements, often an assembly of non-metals forming at least part of the anionic part of the inorganic salt. Accordingly, a specific first mineral can be classified into two or more specific classes out of a list of mineral classes at the same time. In such a list, the specific mineral is a combined mineral. For example, chalcopyrite (CuFeS2) is a copper mineral, an iron mineral and a sulfide mineral at the same time. It is in this meaning a combined mineral, i.e. a copper-iron-sulfide mineral. The first mineral is for example a sulfide mineral (chalcopyrite: CuFeS2; galenite: PbS; sphalerite: ZnS; cinnabarite: HgS), a phosphate mineral (apatite: Ca5[(F,OH,Cl)/(PO4)3), a silicate mineral (Nepouite: (Ni,Mg)6[(OH)8Si4O10]; beryll: Be3Al2(SiO3)6; spodumene: LiAl(SiO3)2), a carbonate mineral (magnesite: MgCO3), a fluoride mineral, a chloride mineral, an oxide mineral (chromite: (Fe,Mg)Cr2O4; cassiterite: SnO2), a copper mineral (chalkosine: Cu2S; bornite: Cu5FeS4), a molybdenum mineral (molybdaenite: MoS2), a zinc mineral (smithsonite: ZnCO3), a lead mineral (cerussite: PbCO3), a nickel mineral (pentlandite: (Fe,Ni)9S8), an iron mineral (magnetite: Fe3O4; hematite: Fe2O3; siderite: Fe[C03]; goethite: FeO(OH)), a manganese mineral (pyrolusite: MnO2; psilomelane: (Ba, $H_2O$)4Mn10O20), a titanium mineral (rutil: TiO2, ilmenite: FeTiO3), a cobalt mineral (skutterudite: (Co,Ni)As3; cobaltite: CoAsS; coltan: (Fe,Mn)(Nb, Ta)2O6), a tungsten mineral (wolframite: (Fe,Mn)WO4, scheelite: CaWO4), a vanadium mineral (vanadinite: Pb5 (VO4)3Cl; carnotite: K2(UO2)(VO4)2·3H2O), a tin mineral (stannite: Cu2FeSnS4), an aluminium mineral (bauxite: Al(OH)3, gibbsite: Al(OH)3, boehmite: gamma-AlO(OH), diaspore: AlO(OH)), a lithium mineral (amblygonite: LiAl [PO4]F, lepidolith: K(Li,Al)3[(Al,Si)4O10](F,OH)2), a scandium mineral, a yttrium mineral, a lanthanum mineral, a cerium mineral (bastnaesite: (Ce,La,Y)(CO3)F or (Ce,La, Y)(CO3)(OH,F)), a praseodymium mineral, a neodymium mineral (monazite: (La,Ce,Nd,Sm)[PO4]), a samarium mineral, an europium mineral, a gadolinium mineral, a terbium mineral, a dysprosium mineral, a holmium mineral, an erbium mineral, a thulium mineral, a ytterbium mineral, a lutetium mineral, a ruthenium mineral, a rhodium mineral, a palladium mineral, a silver mineral (argentite: Ag2S), an osmium mineral, an iridium mineral, a platinum mineral (sperrylith: PtAs2) or a gold mineral (calaverite: AuTe2).

Preferably, the first mineral is a sulfide mineral, a phosphate mineral, a silicate mineral, a carbonate mineral, a fluoride mineral, a chloride mineral, an oxide mineral, a copper mineral, a molybdenum mineral, a zinc mineral, a lead mineral, a nickel mineral, an iron mineral, a manganese mineral, a titanium mineral, a cobalt mineral, a tungsten mineral, a vanadium mineral, a tin mineral, an aluminium mineral, a lithium mineral, a scandium mineral, a yttrium mineral, a lanthanum mineral, a cerium mineral, a praseodymium mineral, a neodymium mineral, a samarium mineral, an europium mineral, a gadolinium mineral, a terbium mineral, a dysprosium mineral, a holmium mineral, an erbium mineral, a thulium mineral, a ytterbium mineral, a lutetium mineral, a ruthenium mineral, a rhodium mineral, a palladium mineral, a silver mineral, an osmium mineral, an iridium mineral, a platinum mineral, a gold mineral or a combined mineral, which has a chemical composition assigning the combined mineral to two or more of the aforementioned minerals at the same time. Very preferably, the first mineral is a sulfide mineral, a phosphate mineral, a silicate mineral, a carbonate mineral, a fluoride mineral, a chloride mineral, a copper mineral, a molybdenum mineral, a zinc mineral, a lead mineral, a nickel mineral, an iron mineral, a scandium mineral, a yttrium mineral, a lanthanum mineral, a cerium mineral, a praseodymium mineral, a neodymium mineral, a samarium mineral, an europium mineral, a gadolinium mineral, a terbium mineral, a dysprosium mineral, a holmium mineral, an erbium mineral, a thulium mineral, a ytterbium mineral, a lutetium mineral, a ruthenium mineral, a rhodium mineral, a palladium mineral, an osmium mineral, an iridium mineral, a platinum mineral, a gold mineral or a combined mineral, which has a chemical composition assigning the combined mineral to two or more of the aforementioned minerals at the same time. Particularly, the first mineral is a sulfide mineral, a phosphate mineral, a silicate mineral, a carbonate mineral, a fluoride mineral, a copper mineral, a molybdenum mineral, a zinc mineral, a lead mineral, a nickel mineral, an iron mineral, a gold mineral or a combined mineral, which has a chemical composition assigning the combined mineral to two or more of the aforementioned minerals at the same time. Very particularly, the first mineral is a sulfide mineral, a phosphate mineral, a copper mineral, a gold mineral or a combined mineral, which has a chemical composition assigning the combined mineral to two or more of the aforementioned minerals at the same time.

Preferred is a method, wherein the ore comprises a first mineral, which is a sulfide mineral, a phosphate mineral, a silicate mineral, a carbonate mineral, a fluoride mineral, a chloride mineral, an oxide mineral, a copper mineral, a molybdenum mineral, a zinc mineral, a lead mineral, a nickel mineral, an iron mineral, a manganese mineral, a titanium mineral, a cobalt mineral, a tungsten mineral, a vanadium mineral, a tin mineral, an aluminium mineral, a lithium mineral, a scandium mineral, a yttrium mineral, a lanthanum mineral, a cerium mineral, a praseodymium mineral, a neodymium mineral, a samarium mineral, an europium mineral, a gadolinium mineral, a terbium mineral, a dysprosium mineral, a holmium mineral, an erbium mineral, a thulium mineral, a ytterbium mineral, a lutetium mineral, a ruthenium mineral, a rhodium mineral, a palladium mineral, a silver mineral, an osmium mineral, an indium mineral, a platinum mineral, a gold mineral or a combined mineral, which has a chemical composition assigning the combined mineral to two or more of the aforementioned minerals at the same time.

A weight ratio between component (i), i.e. the ore, which is in the form of particles, and component (iii), i.e. the first frothing agent, is determined based on the dry weight of component (i). It typically takes only a small amount component (iii). For example, the amount of component (iii) in the aqueous suspension is in the range of 0.00001 to 0.1 parts by weight based on 100 parts by weight of component (i). This is equivalent to a dosage of component (iii) in the range of 0.1 to 1000 g/t of dry ore. Preferably, the amount of component (iii) in the aqueous suspension is in the range of 0.0001 to 0.05 parts by weight based on 100 parts by weight of component (i). This is equivalent to a dosage of component (iii) in the range of 1 to 500 g/t of dry ore. Very preferably, the amount of component (iii) in the aqueous suspension is in the range of 0.0005 to 0.025 parts by weight based on 100 parts by weight of component (i) (5 to 250 g/t of dry ore), particularly in the range of 0.0007 to 0.01 parts by weight (7 to 100 g/t of dry ore), very particularly in the range of 0.0008 to 0.007 parts by weight (8 to 70 g/t of dry ore), especially in the range of 0.0009 to 0.0045 parts by weight (9 to 45 g/t of dry ore) and very especially in the range of 0.001 to 0.0035 parts by weight (10 to 35 g/t of dry ore).

Preferred is a method, wherein the amount of component (iii) in the aqueous suspension is in the range of 0.0001 to 0.1 parts by weight based on 100 parts by weight of component (i).

Preferred is a method, wherein the amount of component (iii) in the aqueous suspension is in the range of 0.001 to 0.05 parts by weight based on 100 parts by weight of component (i).

A weight ratio between component (i), i.e. the ore, which is in the form of particles, and component (ii), i.e. water, is determined based on the dry weight of component (i). Desired for economic reasons are highly concentrated aqueous suspensions, i.e. a pulp. Preferably, the amount of component (ii) in the aqueous suspension is in the range of 70 to 1100 parts by weight based on 100 parts by weight of component (i). This is equivalent to a solids content of dry ore in the range of 58.8 wt. % to 8.3 wt. %, if the weight of any other component of the aqueous suspension different to component (i) and component (ii) is neglected for the calculation, i.e. set to zero. Very preferably, the amount of component (ii) in the aqueous suspension is in the range of 100 to 900 parts by weight based on 100 parts by weight of component (i) (solids content of 50 wt. % to 10 wt. %), particularly in the range of 110 to 800 parts by weight of component (ii) (solids content of 47.6 wt. % to 11.1 wt. %), very particularly in the range of 120 to 600 parts by weight of component (ii) (solids content 45.5 wt. % to 14.3 wt. %), especially in the range of 130 to 420 parts by weight of component (ii) (solids content 43.5 wt. % to 19.2 wt. %) and very especially in the range of 150 to 400 parts by weight of component (ii) (solids content 40 wt. % to 20 wt. %).

Preferred is a method, wherein the amount of component (ii) in the aqueous suspension is in the range of 70 to 1100 parts by weight based on 100 parts by weight of component (i).

Preferably, the amount of component (iii) in the aqueous suspension is in the range of 0.0001 to 0.1 parts by weight based on 100 parts by weight of component (i) and the amount of component (ii) in the aqueous suspension is in the range of 70 to 1100 parts by weight based on 100 parts by weight of component (i).

The flotation cell is a container, which has an opening at its upper side and possesses a gadget to introduce air, which allows the introduced air to flow from the inner bottom side of the container finally to the opening. The opening is designed to allow a removal of froth from the surface. Optionally, the flotation cell comprises a stirrer, for example an impeller, which allows to stir a liquid content of the container. Optionally, the gadget to introduce air is integrated in the impeller. Preferably, the gadget to introduce air generates small bubbles when air is introduced, for example by many small orifices at the outlet of the gadget. For example, the outlet is a frit. Preferably, the gadget to introduce air is equipped with a rotameter. Optionally, the flotation cell is equipped with an automated system for removal of obtained froth.

At step (B), the provided aqueous suspension is preferably stirred during introducing of air. The provided aqueous suspension is preferably kept at atmospheric pressure during introducing of air. Atmospheric pressure means the pressure of the atmosphere at the surrounding of the flotation cell, i.e. barometric pressure, and this is achieved at least by the opening of the container being in exchange with the surrounding pressure. Hence, the head space in the flotation cell, i.e. the space above the upper surface of the aqueous suspension respectively above the upper surface of the froth on top of the aqueous suspension, has the pressure of the atmosphere surrounding the flotation cell. The provided aqueous suspension has preferably a temperature in the range of 0° C. to 50° C., very preferably 2° C. to 40° C., particularly 4° C. to 37° C., very particularly 8° C. to 34° C., especially 10° C. to 30° C., very especially 12° C. to 26° C. and most especially at room temperature (around 20° C.).

Preferred is a method, wherein at step (B) the provided aqueous suspension is stirred during introducing of air.

Preferred is a method, wherein at step (B) the provided aqueous suspension is kept at atmospheric pressure during introducing of the air.

Preferred is a method, wherein at step (B) the provided aqueous suspension has a temperature in the range of 0° C. to 50° C. during introducing of the air.

The present method is different to a method for manufacturing of a polyurethane foam, for example by reacting a polyisocyanate and a polyether polyol or a polyester polyol. Preferably, the provided aqueous suspension contains less than 10 parts by weight of an isocyanate, which includes a mono-isocyanate, a di-isocyanate and further polyisocyanates, based on 100 parts by weight of component (iii). Very preferably, the provided aqueous suspension contains less than 5 parts by weight of an isocyanate based on 100 parts by weight of component (iii), particularly less than 1 part by weight of an isocyanate and very particularly is free of an isocyanate. Preferably, the method for flotation contains less than 100 parts by weight of a polyurethane based on 100 parts by weight of component (iii), very preferably less than 10 parts by weight of a polyurethane and particularly, the method is free of a polyurethane. Preferably, the obtained froth is free from a polyurethane. Preferably, the method for flotation contains less than 100 parts by weight of a polyurethane, a polyester, a polyamide or a mixture thereof based on 100 parts by weight of component (iii), very preferably less than 10 parts by weight. Preferably, the obtained froth is free from a polyurethane, a polyester, a polyamide or a mixture thereof.

Preferred is a method, wherein (A) the provided aqueous suspension contains less than 10 parts by weight of an isocyanate based on 100 parts by weight of component (iii).

An aqueous paper pulp comprises cellulose fibers and water. Used cellulose fibers are cellulose fibers, which originate from an aqueous resuspension of once formed paper. Virgin cellulose fibers originate from grounded plants. A paper pulp, which is obtained by including resuspended paper as a source for cellulose fiber, is a wastepaper pulp. Wastepaper pulp comprises used cellulose fibers. Ink particles are herein defined as particles, which have been formulated as an ink and afterwards have been adhered to a paper. Ink particles are preferably organic pigments. In addition to cellulose fibers, which originate from a resuspended pater, and water, the aqueous wastepaper pulp can also further comprise ink particles. Preferably, the aqueous suspension comprises less than 10 parts by weight of cellulose fibers based on 100 parts by weight of dry ore, very preferably less than 8 parts, particularly less than 5 parts, very particularly less than 2 parts and especially is free of cellulose fibers. Preferably, the aqueous suspension comprises less than 3 parts by weight of ink particles on 100 parts by weight of dry ore, very preferably less than 1 parts by weight of ink particles, particularly less than 0.1 parts of ink particles and especially is free of ink particles. Preferably, the method for flotation of an ore is free of cellulose fibers, which originate from a resuspended paper, very preferably free of cellulose fibers. Preferably, the method for flotation of an ore is free of ink particles.

Preferred is a method, wherein (A) the provided aqueous suspension contains less than 10 parts by weight of cellulose fibers based on 100 parts by weight of component (i).

Often, an ore comprises beneath a first mineral also a second mineral, which is different to the first mineral. Typically, an ore comprises a desired mineral (=valuable) and an undesired mineral (=gangue). An undesired mineral can consist essentially out of one mineral or can comprise a series of different undesired minerals. Similarly, a desired mineral can consist essentially out of one mineral or can comprise a series of different desired minerals. More often, the desired mineral consists essentially out of one mineral. Flotation is a method often used to increase the relative content of a desired mineral in a concentrate via separating from undesired parts of the ore. Accordingly, the ore is beneficiated. Arbitrarily, the first mineral might be considered the valuable mineral and the second mineral might be considered the undesired mineral. When the obtained froth is removed respectively separated from the flotation cell, for example by skimming of the surface of the provided aqueous suspension while air is introduced or shortly thereafter, i.e. prior to a significant collapsing of the obtained froth, then the removed respectively separated froth represents a froth concentrate. Without a continued introducing of air, the froth in the froth concentrate collapses successively. When the obtained froth is separated from the flotation cell, the remaining parts of the provided aqueous suspension form a cell concentrate. The cell concentrate remains in the flotation cell or is removed from the flotation cell, preferably at a location different to the location of the removal of the froth. For example, the cell concentrate is removed from the bottom of the flotation cell. In a continuous way of running of the method, a respective design to allow an underflow removal of the cell concentrate from the flotation cell is possible. Introducing of air may be continued until no more froth is formed. This might last for example for one minute or up to 15 or 20 minutes. Preferably, the method comprises additionally as step (C) separating the froth from the flotation cell to obtain a froth concentrate and a cell concentrate. It is possible that the weight ratio between the first mineral and the second mineral is higher in the obtained froth concentrate than the weight ratio between the first mineral and the second mineral in the obtained cell concentrate. If the first mineral is the desired mineral, then this is called a direct flotation. It is also possible that the weight ratio between the first mineral and the second mineral is lower in the obtained froth concentrate than the weight ratio between the first mineral and the second mineral in the obtained cell concentrate. If the first mineral is the desired mineral, then this is called an indirect flotation or a reverse flotation. At both possibilities, an enrichment occurs. At this enrichment, a high recovery of the desired first mineral with a high selectivity is targeted.

Preferably, the obtained froth is not stable, i.e. after introducing of air is stopped or after the obtained froth is separated, the obtained froth starts to collapse. For example, 15 min after a stop of introducing air or 15 min after separation of the obtained froth, its froth volume is reduced to less than half of the froth volume at the moment of stopping of introducing air or of separating the obtained froth. Very preferably, this occurs 10 min after the stop of introducing air or 10 min after separation of the obtained froth, particularly 7 min, very particularly 5 min, especially 3 min and very especially 2 min.

Preferred is a method, wherein the ore comprises a first mineral and a second mineral, which is different to the first mineral.

Preferred is a method, wherein the method comprises additionally the step (C) separating the froth from the flotation cell to obtain a froth concentrate and a cell concentrate.

Preferred is a method, wherein at step (C) the weight ratio between the first mineral and the second mineral is higher in the obtained froth concentrate than the weight ratio between the first mineral and the second mineral in the obtained cell concentrate.

For improvement of an enrichment of a desired mineral contained in the ore, a first flotation auxiliary, which is different to poly(tetrahydrofuran), is a possible further component, i.e. component (iv), of the aqueous suspension. A collector attaches to the surface of the ore particles and is preferably a surface-active molecule. Ideally, the collector attaches to the surfaces with a different affinity for the surface of the first mineral and the surface of the second mineral. This leads to a different hydrophobicity of the minerals and hence a different affinity to the air bubbles. For a differentiation of the different possible flotation auxiliaries, it is herein defined that a surface-active molecule possesses a hydrophilic structural element and a lipophilic structural element, a merely hydrophilic molecule possesses only a hydrophilic structural element and a merely lipophilic molecule possesses only a lipophilic structural element. A collector can further be differentiated into an ionic collector, which is a surface-active ionic molecule, and a non-ionic collector, which is a non-ionic surface active molecule. The ionic collector is an anionic surface-active substance, an amphoteric surface-active substance or a cationic surface-active substance. A depressing agent is a merely hydrophilic molecule and attaches to the surface of the ore particles and ideally with a different affinity for the surface of the first mineral and the surface of the second mineral. A second frothing agent is a non-ionic surface-active compound and supports the froth generating of the first frothing agent. An extender oil is a hydrocarbon, which is a merely lipophilic molecule, and ideally allows to reduce the necessary amounts of a collector. A pH-regulating substance is an acid or a base, which is preferably merely hydrophilic, and helps to keep an optimum pH-value of the aqueous suspension, since surface charges are often pH-dependent. Dependent on the technical requirements, one or more flotation auxiliaries, which are all different to poly(tetrahydrofuran), can be employed. In case there is more than one flotation auxiliary, the numbering is continued, i.e. a first flotation auxiliary, which is component (iv), and a second flotation auxiliary, which is component (v). In analogy a third flotation auxiliary is component (vi). The first flotation auxiliary is for example a collector, a non-ionic surface-active compound, which is a non-ionic collector or a second frothing agent, a depressing agent, an extender oil or a pH-regulating substance. Preferably, the first flotation auxiliary is a surface-active collector, a non-ionic surface-active compound, which is a non-ionic collector or a second frothing agent, a depressing agent, an extender oil or a pH-regulating substance. Very preferably, the first flotation auxiliary is an ionic collector, a non-ionic surface-active compound, which is a non-ionic collector or a second frothing agent, a depressing agent, an extender oil or a pH-regulating substance.

The ionic collector, which is an anionic surface-active substance, an amphoteric surface-active substance or a cationic surface-active substance, is chosen according to the targeted mineral. For a sulfide mineral, the first collector is for example an anionic surface-active substance, which is a xanthate (e.g. S═C(OR)—S—K+(Na+) with R being an aliphatic hydrocarbon chain, usually 2-5 carbon atoms), a dithiophosphate (e.g. S═P(OR)2-S— K+(Na+) with R being an aliphatic hydrocarbon chain, usually 2-5 carbon atoms), a dithiocarbamate (e.g. S═C(NR1R2)-S— K+(Na+) with R1 and R2 being an aliphatic hydrocarbon chain), a dixanthogene (e.g. S═C(OR)—S—S—C(═S)OR with R being an aliphatic hydrocarbon chain, usually 2-5 carbon atoms), an alkyl thionocarbamate (e.g. R1-NH—C(═S)(OR2) with R1 and R2 being an aliphatic hydrocarbon chain). For a sulfide mineral, the first collector is for example a cationic surface-active substance, which is an alkyl thioether amine (e.g. R—S—CH2-CH2-NH2 with R being an aliphatic hydrocarbon chain) (for reference: S. R. Rao, chapter 10.1 "Collectors for sulfide minerals", p. 479 f) in Surface Chemistry of Froth Flotation, Springer Media, 2004). For a phosphate mineral, the first collector is for example an anionic surface-active substance, which is a fatty acid, an alkyl sulfonate (for example an alkyl sulfosuccinate), an alkyl sulfate, an alkyl sarcosinate or an alkyl mono- or diester of phosphoric acid. For a phosphate mineral, the first collector is for example an amphoteric surface-active substance, which is a N-(alkyl)-glycine or a N(-3-alkyloxy-2-hydroxy-propyl)glycine. For an iron oxide mineral, the first collector is for example a cationic surface active substance, which is an alkyl amine, for example a N-(alkoxypropyl) amine or a N'—(N-(alkoxypropyl)amino)propyl) amine, or an N-(alkylamido)alkylene diamine.

The non-ionic collector is for example an ethoxylated fatty acid, an ethoxylated fatty amide or an ethoxylated fatty alcohol.

The second frothing agent is for example a cyclic terpene alcohol, particularly alphaterpineol, which is a main constituent of pine oil, methylisobutyl carbinol, a non-cyclic C6-C12 alcohol, particularly 2-ethylhexanol or hexanol, a high-boiling fraction from the oxo-synthesis of 2-ethylhexanol, an alcoholic aliphatic ester, particularly a mixture comprising 2,2,4-trimethyl-1,3-pentandiolmonoisobutyrate, triethoxybutane, an ethoxylated and/or propoxylated non-cyclic C1-C6 alcohol, polyethylene glycol or polypropylene glycol. In case of a second frothing agent, the first frothing agent and the second frothing agent can be added together to obtain the provided aqueous suspension, i.e. as a mixture of frothing agents comprising the first frothing agent and the second frothing agent. Alternatively, the first frothing agent and the second frothing agent can be added individually to obtain the provided aqueous suspension.

The depressing agent is for example a hydrophilic polysaccharide, particularly a starch, or sodium silicate. The starch is for example a native starch or a modified starch. A native starch is for example a starch from corn, wheat, oat, barley, rice, millet, potato, pea, tapioca or manioc. The native starch is preferably pre-gelled, i.e. warmed for starch gelation.

The extender oil is for example kerosene.

The pH-regulating substance is for example NaOH, Na2CO3, KOH, K2CO3, HCl, H2SO4, H3PO4 or HNO3.

Preferred is a method, wherein at step (A) the aqueous suspension comprises additionally (iv) a first flotation auxiliary, which is different to poly(tetrahydrofuran).

Preferred is a method, wherein at step (A) the aqueous suspension comprises additionally (iv) a first flotation auxiliary, which is different to poly(tetrahydrofuran) and is a collector, a second frothing agent, a depressing agent, an extender oil or a pH-regulating substance.

Preferred is a method, wherein at step (A) the aqueous suspension comprises additionally (iv) a first flotation auxiliary, which is different to poly(tetrahydrofuran) and a collector.

Preferred is a method, wherein at step (A) the aqueous suspension comprises additionally (iv) a first flotation auxiliary, which is different to poly(tetrahydrofuran) and is an ionic collector, which is an anionic surface-active substance, an amphoteric surface-active substance or a cationic surface-active substance, a non-ionic surface active compound, which is a non-ionic collector or a second frothing agent, a depressing agent, an extender oil or a pH-regulating substance.

Preferred is a method, wherein the first flotation auxiliary is an ionic collector, which is an anionic surface-active substance, an amphoteric surface-active substance or a cationic surface-active substance.

Preferred is a method, wherein the first flotation auxiliary is different to poly(tetrahydrofuran) and is a non-ionic surface-active compound, which is a non-ionic collector or a second frothing agent.

Preferred is a method, wherein the first flotation auxiliary is a second frothing agent.

Preferred is a method, wherein the first flotation auxiliary is a second frothing agent and the second frothing agent is a cyclic terpene alcohol, methylisobutyl carbinol, a non-cyclic C6-C12 alcohol, a high-boiling fraction from the oxo-synthesis of 2-ethylhexanol, an alcoholic aliphatic ester, triethoxybutane, an ethoxylated and/or propoxylated non-cyclic C1-C6 alcohol, polyethylene glycol or polypropylene glycol.

Preferred is a method, wherein at step (A) the aqueous suspension comprises (iv) a first flotation auxiliary, which is a second frothing agent, and (v) a second flotation auxiliary, which is different to poly(tetrahydrofuran) and a collector.

Preferred is a method, wherein at step (A) the aqueous suspension comprises (iv) a first flotation auxiliary, which is a second frothing agent, and (v) a second flotation auxiliary, which is different to poly(tetrahydrofuran) and is an ionic collector.

The above described preferences for the method for flotation of an ore are described for the method. These preferences apply also to the further embodiments of the invention.

A further embodiment of the invention is an aqueous suspension comprising (i) an ore, which is in the form of particles, (ii) water, (iii) a first frothing agent, characterized in that the frothing agent is a poly(tetrahydrofuran), the amount of component (iii) in the aqueous suspension is in the range of 0.00001 to 0.1 parts by weight based on 100 parts by weight of component (i), and the amount of component (ii) in the aqueous suspension is in the range of 100 to 1000 parts by weight based on 100 parts by weight of component (i).

Preferably, the amount of component (iii) in the aqueous suspension is in the range of 0.0001 to 0.05 parts by weight based on 100 parts by weight of component (i).

A further embodiment of the invention is a use of a first frothing agent as a component (iii) of an aqueous suspension, which comprises additionally (i) an ore, which is in the form of particles, and (ii) water, for generating froth in a flotation cell, when air is introduced into the aqueous suspension, characterized in that the first frothing agent is a poly(tetrahydrofuran).

Preferably, the use of the first frothing agent generates froth with a high froth height.

Preferably, the use of the first frothing agent generates froth at a lower dosage than 4-methyl-2-pentanol, very preferably at a lower dosage than 4-methyl-2-pentanol based on a same froth height.

FIG. 1 shows a picture of the two-phase test of example E-1 with an aerated aqueous solution of Poly THF 250.

FIG. 2 shows a picture of the two-phase test of example E-1 with an aerated aqueous solution of Poly THF 650.

Figure 1:
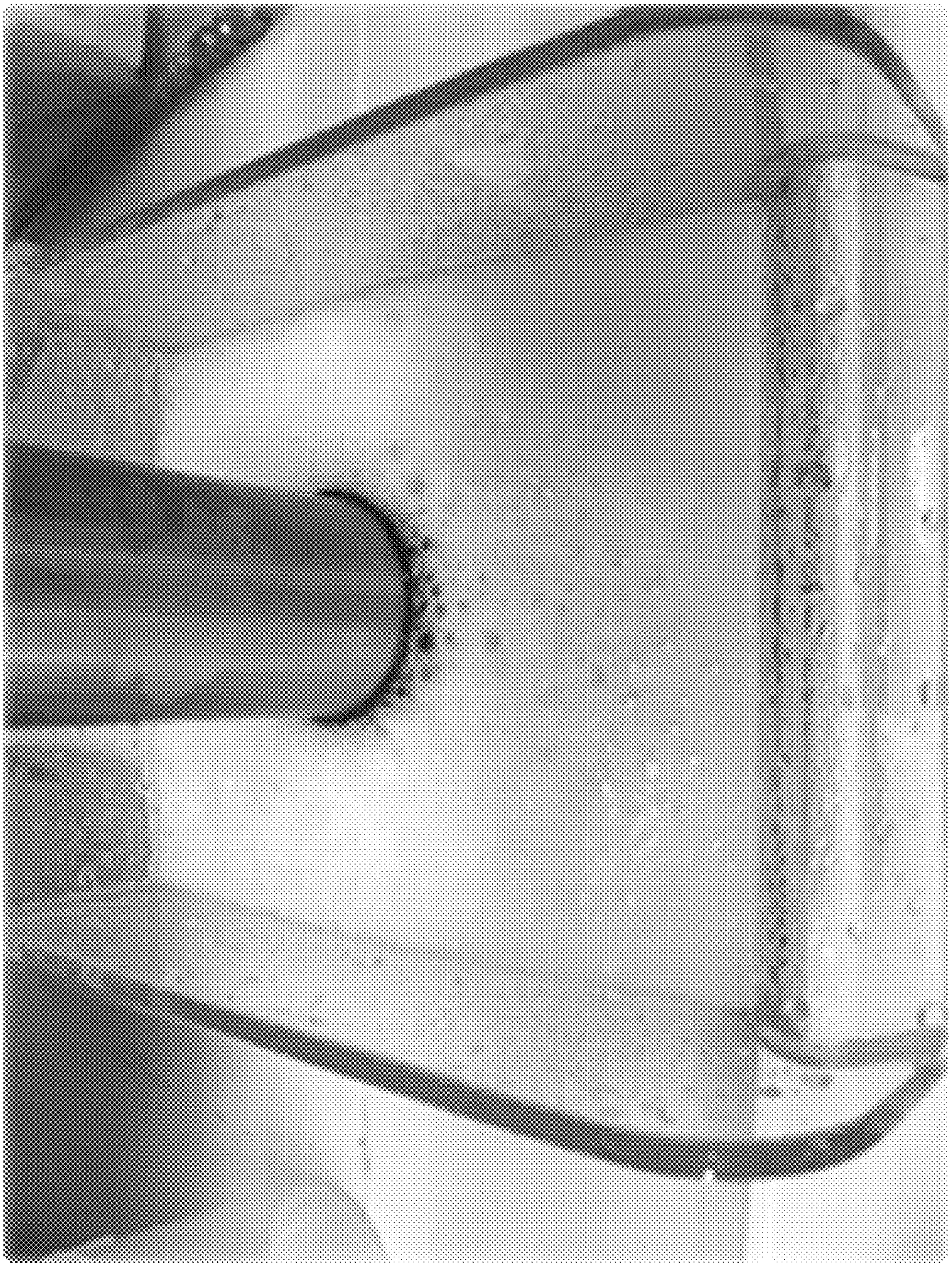
FIGS. 1 and 2 are attached and described below.

The following examples illustrate further the invention without limiting it. Percentage values are percentage by weight if not stated differently.

A) Methods for Characterization

A number-average weight of a poly(tetrahydrofuran) is determined by a wet-chemically determined hydroxyl number.

B) Agents

B.1) Collector/Collecting Agent

Xanthate is sodium isobutyl xanthate (SIBX) [CAS 25306-75-6] with molecular formula C5H9NaOS2 and molecular mass 172.2.

SIBX is commercially available for example from Redox.

B) Frothing Agents

MIBC is methyl isobutyl carbinol resp. 4-methyl-2-pentanol [CAS-No. 108-11-2] with a molecular weight of 88.1 g/mol as depicted below

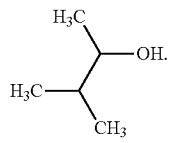

It is commercially available for example from Sigma-Aldrich Ltd.

Butyl Triglycol is Triethylene glycol monobutyl ether [CAS-No. 143-22-6] with Molecular Formula C10H22O4 and Molecular Mass of 206.28.

It is commercially available for example from Sigma-Aldrich Ltd.

High-boiling fraction from 2-ethyl-1-hexanol manufacturing process (HBF-2EH) [CAS 68609-68-7], which is a combination of hydrocarbons in the range of C4 through C16 produced by the distillation of products from a 2-ethyl-1-hexanol manufacturing process and boiling in the range of 199° C. to 308° C. (390° F. to 586° F.).

Polypropylene Glycol (230MW) [CAS-No. 25322-69-4] is a polymer of the monomer propylene glycol with a molecular weight of 230 g/mol and can be depicted as H(C3H6O)nOH and is commercially available for example from Sigma-Aldrich.

Poly THF 250 is a poly(tetrahydrofuran) resp. H(OCH2CH2CH2CH2)xOH [CAS-No. 25190-06-1] as depicted below

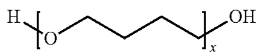

with a number-average molecular weight Mn of 250. It is commercially available for example from Sigma-Aldrich Ltd. The grade commercially available from Sigma-Aldrich Ltd contains 2,6-di-tert-butyl-4-methyl-phenol as stabilizer in an amount below 0.05 wt. %.

Poly THF 650 is a poly(tetrahydrofuran) resp. H(OCH2CH2CH2CH2)yOH [CAS-No. 25190-06-1] as depicted below

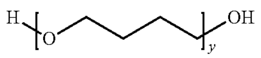

with a number-average molecular weight Mn of 650. It is commercially available for example from Sigma-Aldrich Ltd. The grade commercially available from Sigma-Aldrich Ltd contains 2,6-di-tert-butyl-4-methyl-phenol as stabilizer in an amount between 0.05 wt. % and below 0.07 wt. %.

C) Aeration of an Aqueous Suspension of Solids

Example C-1: Aeration of an Aqueous Phosphate Ore Pulp

For testing a system with three phases, an amount of ore calculated as 1000 g of dry ore are set in a 2.2 L flotation cell of a Denver D12 flotation machine and water is added to obtain an aqueous pulp with 34% solids content by weight. The ore is a ground phosphate ore, where fine particles are removed (deslimed oxide) and the 1000 g are without slimes. 80 wt. % of the particles of the phosphate ore pass a 250 μm sieve. The flotation machine is turned on and its impeller rotation speed is set to 1000 revolutions per minute, which ensures an adequate suspension of solids. A frothing agent is added as defined in table C-1 to the agitated pulp and conditioned for 1 minute. A collector is not added to the pulp (aqueous suspension) to avoid a contribution of the collector to a foam generation. Air is introduced as a regulated flow at varying flow rates as defined in table C-1. The froth is allowed to reach a steady state over 30 seconds and then the froth height is measured. The temperature of the stirred suspension is room temperature (around 20° C.), i.e. there is no heating or cooling. The surrounding pressure is atmospheric pressure. Results of the measured froth heights are listed in table C-1.

TABLE C-1

| example | frothing | dose | froth height [mm] at air flow rates [L/h] [d] | | | |
|---|---|---|---|---|---|---|
| No. | agent | [g/t] [c] | 200 | 300 | 400 | 500 |
| C-1-1 [a] | MIBC | 10 | 2 | 3 | 5 | — |
| C-1-2 [b] | Poly THF 250 | 10 | 4 | 6 | 8 | 9 |
| C-1-3 [a] | MIBC | 30 | 2 | 5 | 7 | — |
| C-1-4 [b] | Poly THF 250 | 30 | 9 | 11 | 13 | 14 |

Footnotes:
[a] comparative
[b] inventive
[c] gram per ton of dry ore
[d] liter of air per hour Table C-1 shows that by comparison of examples C-1-2 with C-1-1 and C-1-4 with C-1-3, Poly THF 250 generates a froth height, which is at the same applied amount higher than the one of MIBC;

by comparison of examples C-1-2 with C-1-3, Poly THF 250 generates a froth height, which is not reached by MIBC even at a tripled amount.

Example C-2: Aeration of a Copper Molybdenum Sulfide Ore Pulp

For testing a system with three phases (water-air-solids), an amount of ore calculated as 1000 g of dry ore are set in a 2.2 L flotation cell of a Denver D12 flotation machine and water is added to obtain an aqueous pulp with 34% solids content by weight. The ore is a ground copper molybdenum sulfide ore. 80 wt. % of the particles of the copper molybdenum sulfide ore pass a 150 μm sieve. The flotation machine is turned on and its impeller rotation speed is set to 1000 revolutions per minute, which ensures an adequate suspension of solids. A frothing agent is added as defined in table C-2 to the agitated pulp and conditioned for 1 minute. A collector is not added to the pulp (aqueous suspension) to avoid a contribution of the collector to a foam generation. Air is introduced as a regulated flow at varying flow rates as defined in table C-2. The froth is allowed to reach a steady state over 30 seconds and then the froth height is measured. The temperature of the stirred suspension is room temperature (around 20° C.), i.e. there is no heating or cooling. The surrounding pressure is atmospheric pressure. Results of the measured froth heights are listed in table C-1.

TABLE C-2

| example | frothing | dose | froth height [mm] at air flow rates (L/h) [d] | | | | |
|---|---|---|---|---|---|---|---|
| No. | agent | [g/t] [c] | 200 | 300 | 400 | 500 | 600 |
| C-2-1 [a] | MIBC | 10 | 5 | 8 | 11 | 14 | 15 |
| C-2-2 [b] | Poly THF 250 | 10 | 7 | 10 | 13 | 15 | 17 |
| C-2-3 [a] | MIBC | 30 | 5 | 8 | 12 | 15 | 16 |
| C-2-4 [b] | Poly THF 250 | 30 | 10 | 13 | 17 | 22 | 27 |

Footnotes:
[a] comparative
[b] inventive
[c] gram per ton of dry ore
[d] liter of air per hour Table C-2 shows that by comparison of examples C-2-2 with C-2-1 and C-2-4 with C-2-3, Poly THF 250 generates a froth height, which is at the same applied amount higher than the one of MIBC;

by comparison of examples C-2-2 with C-2-3, Poly THF 250 generates a froth height, which is mostly not reached by MIBC even at a tripled amount.

D) Flotation of an Aqueous Suspension of Solids

Example D-1: Flotation of a Copper Molybdenum Sulfide Ore

A ground copper molybdenum sulfide ore is subjected to flotation employing a collector (SIBX) and a sole frothing agent as indicated in table D-1. All other variables including the collector are remained constant. The obtained flotation results are depicted in table D-1.

TABLE D-1

| example No. | D-1-1 [a)] | D-1-2 [b)] |
|---|---|---|
| frothing agent | PPG 230 [c)] | Poly THF 250 |
| froth concentrate (= from removed froth) | | |
| Mass to froth (corresponds to mass recovery) [%] [d)] | 9.68 | 9.64 |
| copper grade [%] [e)] (from removed froth) | 5.43 | 5.44 |
| copper recovery [%] [f)] (amount to froth) | 91.6 | 92.8 |
| molybdenum grade [%] [e)] (from removed froth) | 0.1830 | 0.1960 |
| molybdenum recovery [%] [f)] (amount to froth) | 85.5 | 86.5 |
| cell concentrate (= tailings remaining in cell) | | |
| copper grade [%] [e)] | 0.045 | 0.039 |
| molybdenum grade [%] [e)] | 0.0040 | 0.0030 |

Footnotes:
[a)] comparative
[b)] inventive
[c)] standard frothing agent used
[d)] the proportion of feed that reports to the removed froth
[e)] comparative metals analysis
[f)] comparative Table D-1 shows that by comparison of examples D-1-2 with D-1-1 shows that a change towards Poly THF 250 leads to an improved recovery of copper and molybdenum and a reduced loss of the desired copper and molybdenum into tailings.

Example D-2: Flotation of a Copper Gold Sulfide Ore

A ground copper gold sulfide ore is subjected to a flotation employing a collector (SIBX) and a sole frothing agent as indicated in table D-2. All other variables including the collector are remained constant. The obtained flotation results are depicted in table D-2.

TABLE D-2

| example No. | D-2-1 [a)] | D-2-2 [b)] |
|---|---|---|
| frothing agent | MIBC [c)] | Poly THF 250 |
| froth concentrate (= from removed froth) | | |
| Mass to froth (corrsponds to mass recovery) [%] [d)] | 7.11 | 7.57 |
| copper grade [%] [e)] (from removed froth) | 10.4 | 9.86 |
| copper recovery [%] [f)] (amount to froth) | 74.0 | 74.9 |
| gold grade [ppm by weight] [e)] (from removed froth) | 6.0 | 6.0 |
| gold recovery [%] [f)] (amount to froth) | 64.8 | 66.3 |
| cell concentrate (= tailings remaining in cell) | | |
| copper grade [%] [e)] | 0.28 | 0.27 |
| gold grade [ppm by weight] [e)] | 0.25 | 0.25 |

Footnotes:
[a)] comparative
[b)] inventive
[c)] standard frothing agent used
[d)] the proportion of feed that reports to the removed froth
[e)] comparative metals analysis
[f)] comparative Table D-2 shows that by comparison of examples D-2-2 with D-2-1 a change towards Poly THF 250 leads to an improved recovery of copper and gold and a reduced loss of the desired copper into tailings.

D-3 Flotation of a Copper Sulfide Ore

A ground copper sulfide ore is subjected to flotation employing a collector (SIBX) and a sole frothing agent as indicated in table D-3. All other variables including the collector are remained constant. The obtained flotation results are depicted in table D-3.

TABLE D-3

| Example No | D-3-1 [b)] | D-3-2 [a)] | D-3-3 [a)] | D-3-4 [a)] | D-3-5 [a)] |
|---|---|---|---|---|---|
| Frothing agent | Poly THF 250 | Butyl Triglycol [c)] | MIBC [c)] | HBF-2EH[c)] | Polypropylene Glycol (230 MW) [c)] |
| Mass to froth (corresponds to mass recovery) [%] [d)] | 20.2 | 20.4 | 20.8 | 23.7 | 15.6 |
| froth concentrate (= from removed froth) | | | | | |
| copper grade [%] [e)] (from removed froth) | 10.5 | 9.72 | 8.98 | 8.20 | 11.0 |
| copper recovery [%] [f)] (amount to froth) | 79.9 | 78.5 | 78.4 | 76.1 | 73.3 |

Footnotes:
[a)] comparative
[b)] inventive
[c)] standard frothing agent used
[d)] the proportion of feed that reports to the removed froth
[e)] comparative metals analysis
[f)] comparative Table D-3 shows that:

PolyTHF 250 results in the highest amount of copper reporting to the froth (recovery) compared to other standard frothing agent used.

D-4 Flotation of a Copper Ore with a Binary Mixture of Frothing Agents

A ground copper sulfide ore is subjected to flotation employing a collector (SIBX) and either a mixture of two frothing agents, one of it being PolyTHF 250, or the single frothing agent without PolyTHF 250. All other variables including the collector are remained constant. The obtained flotation results are depicted in table D-4-1.

TABLE D-4

| Example No | Frothing agent 1 | Frothing agent 2 | Mass to froth % | copper grade [%] [e] (= from removed froth) | Copper recovery (Amount to froth) [%] [f] |
|---|---|---|---|---|---|
| D-4-1 [a] | MIBC [c] (100 wt %) | PolyTHF 250 (0 wt %) | 20.8 | 8.98 | 78.4 |
| D-4-2 [b] | MIBC (70 wt %) | PolyTHE 250 (30 wt %) | 21.7 | 9.19 | 79.7 |
| D-4-3 [a] | Butyl Triglycol [c] (100%) | PolyTHF 250 (0%) | 20.4 | 9.72 | 78.5 |
| D-4-4 [b] | Butyl Triglycol (70%) | PolyTHF 250 (30%) | 19.2 | 10.5 | 78.6 |
| D-4-5 [a] | HBF-2EH (100%) [c] | PolyTHF 250 (0%) | 23.7 | 8.20 | 76.1 |
| D-4-6 [b] | HBF-2EH (70%) | PolyTHF 250 (30%) | 21.2 | 9.73 | 77.7 |
| D-4-7 [a] | Polypropylene Glycol (230 MW) [c] (100%) | PolyTHF 250 (0%) | 15.6 | 11.0 | 73.3 |
| D-4-8 [b] | Polypropylene Glycol(230 MW) (70%) | PolyTHF 260 (30%) | 15.4 | 11.9 | 74.0 |

Footnotes:
[a] comparative
[b] inventive
[c] standard frothing agent used
[e] comparative metals analysis
[f] comparative Table D-4 shows that:

By already partially substituting standard frothing agent with PolyTHF 250 (here up to 30%) an increase in the amount of copper that is reporting to the recovered froth can be demonstrated, and Partial substitution results as well in an increase in the grade of copper recovered in the froth.

CONCLUSIONS

When evaluating the performance from flotation experiments under this section D), the ratio of metal recovery compared to the mass recovered is a parameter indicating superior performance. The grade of the product (concentrate) relates very often directly to the mass recovered. However, a higher mass recovery for the same metal recovery may still result in a lower grade product. Thus, the value of the metal recovery is to be prioritized to the value of the mass recovery.

Summarizing the evaluation of the flotation examples herein above it can be observed and concluded that

- When comparing such tests, the recovery of the respective metal is the value of most significance (as stated above), and
- those tests turn out to be best performing, where the amount of the metal, e.g. the copper, is the highest, although the mass to froth may be at the lower end. This results in an elevated metal, respectively copper, grade E) Aeration of an Aqueous Solution For a two-phase system (water-air), an aqueous solution of Poly THF 250 and an aqueous solution of Poly THF 650, both with the same concentration, are prepared. The aqueous solution of Poly THF 250 is placed in a laboratory flotation machine with an impeller, stirred and air is introduced at a constant flow rate. The temperature of the aqueous solution is room temperature (around 20° C.), i.e. there is no heating or cooling. The surrounding pressure is atmospheric pressure. The shaft of the impeller has a black marking ring to allow a relative comparison of froth heights. After the froth height has stabilized, a picture is taken (=FIG. 1). The test is repeated under identical conditions with the aqueous solution of Poly THF 650 and a picture is taken (=FIG. 2). For the aqueous solution with Poly THF 250, the obtained froth and its height is depicted at FIG. 1. For the aqueous solution with Poly THF 650, the obtained froth and its height is depicted at FIG. 2.

Figure 2:
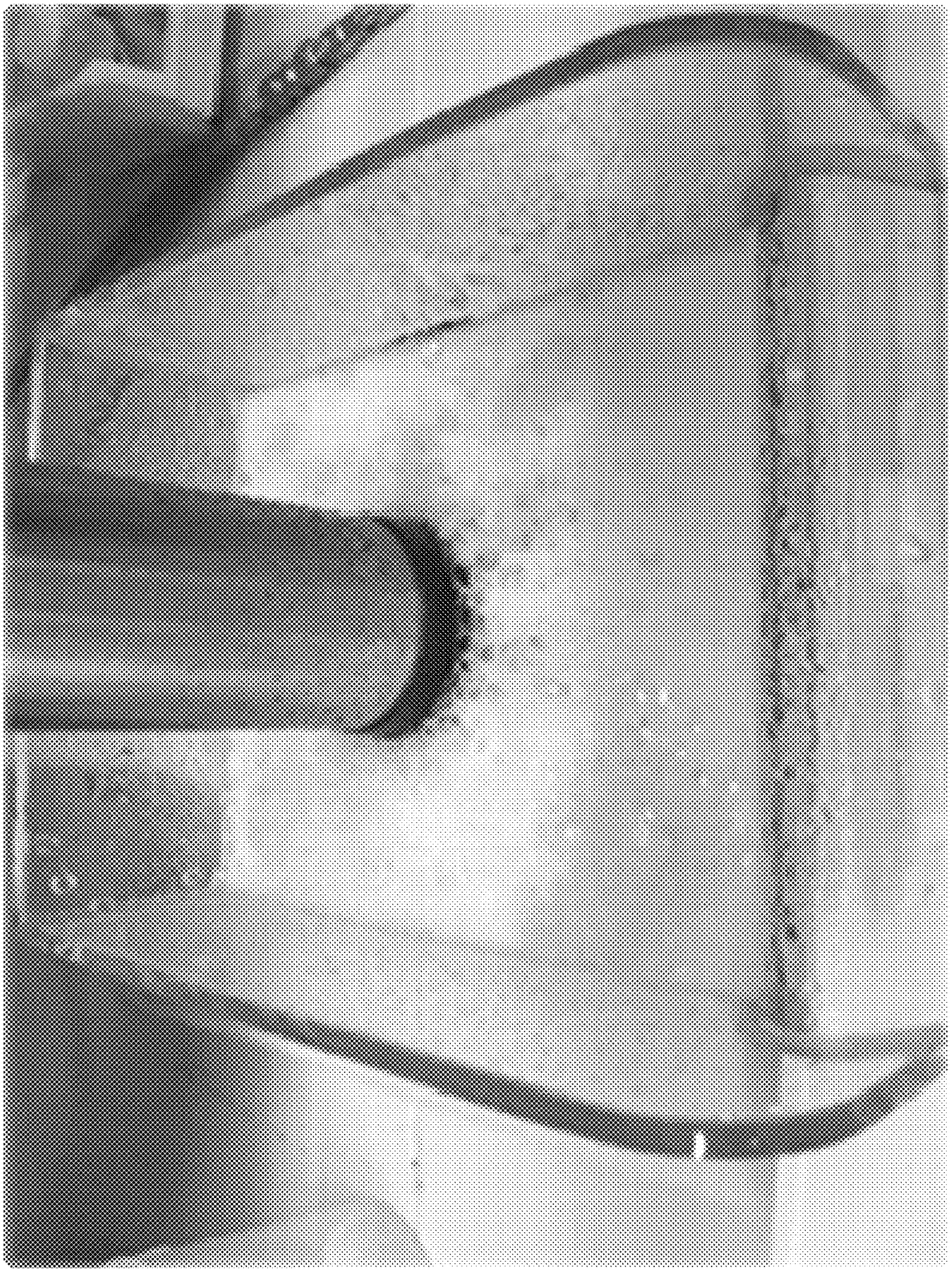

A comparison of FIG. 1 and FIG. 2 shows that both Poly THF 250 and Poly THF 650 generate small and persistent bubbles and act as a frothing agent. Bubble stability is increased respectively bubble coalescence is reduced for Poly THF 250 versus Poly THF 650, which is demonstrated by the height of the generated foam in view of a more stable foam rising higher due to increased bubble stability respectively reduced coalescence. The height of the froth at FIG. 1 with Poly THF 250 reaches the upper end of the black marking at the shaft of the impeller, whereas the height of the froth at FIG. 2 with Poly THF 650 stays below the upper end of the black marking at the shaft of the impeller. A higher bubble stability provides a greater probability of supporting a coarse particle.

We claim:

1. A method for flotation of an ore, comprising:

(A) providing an aqueous suspension comprising (i) an ore, which is in the form of particles, (ii) water, and (iii) a first frothing agent, in a flotation cell to obtain a provided aqueous suspension; and (B) introducing air into the provided aqueous suspension to obtain a froth, wherein the first frothing agent is a poly(tetrahydrofuran) having a number-average molecular weight Mn in the range of 200 to 1200.

2. The method according to claim 1, wherein the poly (tetrahydrofuran) has a number-average molecular weight $M_n$ in the range of 200 to 1000.

3. The method according to claim 1, wherein the amount of component (iii) in the aqueous suspension is in the range of 0.00001 to 0.1 parts by weight based on 100 parts by weight of component (i).

4. The method according to claim 3, wherein the amount of component (iii) in the aqueous suspension is in the range of 0.0001 to 0.05 parts by weight based on 100 parts by weight of component (i).

5. The method according to claim 1, wherein the amount of component (ii) in the aqueous suspension is in the range of 70 to 1100 parts by weight based on 100 parts by weight of component (i).

6. The method according to claim 1, wherein at least 80 percent by weight of the ore particles pass a 500 μm sieve.

7. The method according to claim 1, wherein the ore comprises a first mineral, which is a sulfide mineral, a phosphate mineral, a silicate mineral, a carbonate mineral, a fluoride mineral, a chloride mineral, an oxide mineral, a copper mineral, a molybdenum mineral, a zinc mineral, a lead mineral, a nickel mineral, an iron mineral, a manganese mineral, a titanium mineral, a cobalt mineral, a tungsten mineral, a vanadium mineral, a tin mineral, an aluminium mineral, a lithium mineral, a scandium mineral, a yttrium mineral, a lanthanum mineral, a cerium mineral, a praseodymium mineral, a neodymium mineral, a samarium mineral, an europium mineral, a gadolinium mineral, a terbium mineral, a dysprosium mineral, a holmium mineral, an erbium mineral, a thulium mineral, a ytterbium mineral, a lutetium mineral, a ruthenium mineral, a rhodium mineral, a palladium mineral, a silver mineral, an osmium mineral, an iridium mineral, a platinum mineral, a gold mineral or a combined mineral, which has a chemical composition assigning the combined mineral to two or more of the aforementioned minerals at the same time.

8. The method according to claim 1, wherein at (B) the provided aqueous suspension is stirred during introducing of air.

9. The method according to claim 1, wherein at (B) the provided aqueous suspension is kept at atmospheric pressure during introducing of the air.

10. The method according to claim 1, wherein at (B) the provided aqueous suspension has a temperature in the range of 0° C. to 50° C. during introducing of the air.

11. The method according to claim 1, wherein (A) the provided aqueous suspension contains less than 10 parts by weight of an isocyanate based on 100 parts by weight of component (iii).

12. The method according to claim 1, wherein (A) the provided aqueous suspension contains less than 10 parts by weight of cellulose fibers based on 100 parts by weight of component (i).

13. The method according to claim 7, wherein the ore comprises the first mineral and a second mineral, which is different to the first mineral.

14. The method according to claim 1, further comprising:

(C) separating the froth from the flotation cell to obtain a froth concentrate and a cell concentrate.

15. The method according to claim 14, wherein at (C) the weight ratio between the first mineral and the second mineral is higher in the obtained froth concentrate than the weight ratio between the first mineral and the second mineral in the obtained cell concentrate.

16. The method according to claim 1, wherein at (A) the aqueous suspension further comprises (iv) a first flotation auxiliary, which is different to poly(tetrahydrofuran) and is a collector, a second frothing agent, a depressing agent, an extender oil or a pH-regulating substance, or (v) a second flotation auxiliary, which is different to poly(tetrahydrofuran) and is a collector.

17. The method according to claim 16, wherein (iv) the first flotation auxiliary is a collector or the second frothing agent, optionally, wherein the second frothing agent is a cyclic terpene alcohol, methylisobutyl carbinol, a non-cyclic $C_6$-$C_{12}$ alcohol, a high-boiling fraction from the oxo-synthesis of 2-ethylhexanol, an alcoholic aliphatic ester, triethoxybutane, an ethoxylated and/or propoxylated non-cyclic $C_1$-$C_6$ alcohol, polyethylene glycol or polypropylene glycol.

18. The method according to claim 16, wherein (iv) the first flotation auxiliary is an ionic collector, which is an anionic surface-active substance, an amphoteric surface-active substance or a cationic surface-active substance, a non-ionic surface-active compound, which is a non-ionic collector or a second frothing agent, a depressing agent, an extender oil or a pH-regulating substance.

19. An aqueous suspension comprising:

(i) an ore, which is in the form of particles, (ii) water, and (iii) a first frothing agent, wherein the frothing agent is a poly(tetrahydrofuran), the amount of component (iii) in the aqueous suspension is in the range of 0.00001 to 0.1 parts by weight based on 100 parts by weight of component (i), and wherein the amount of component (ii) in the aqueous suspension is in the range of 100 to 1000 parts by weight based on 100 parts by weight of component (i).

20. A method of using a first frothing agent as a component of an aqueous suspension, comprising:

combining the first frothing agent with an ore, which is in the form of particles, and water to form the aqueous suspension; and generating froth in a flotation cell by introducing air into the aqueous suspension within the flotation cell, wherein the first frothing agent is a poly(tetrahydrofuran).

* * * * *